Effect of Hole Opening Area Ratio and Diameter on Flow Characteristics $\left(\dfrac{\text{Total Holes Area}}{\text{Total Plate Area}} \times 100\right)$ (%)

Effect of Hole Opening Area Ratio and Diameter on Flow Characteristics

3,743,582
METHOD OF FERMENTATION UTILIZING A MULTI-STAGE FERMENTING DEVICE

Atsuo Kitai, Kamakura, Hiroshi Tone, Fujisawa, and Asaichiro Ozaki, Tokyo, Japan, assignors to Sanraku-Ocean Co., Ltd., Tokyo, Japan
Continuation of application Ser. No. 672,870, Oct. 4, 1967. This application May 27, 1970, Ser. No. 40,899
Claims priority, application Japan, Oct. 6, 1966, 41/65,412; May 9, 1967, 42/28,909
Int. Cl. C12b 1/00, 1/10, 1/14
U.S. Cl. 195—141                    10 Claims

ABSTRACT OF THE DISCLOSURE

A method of fermentation utilizing a multi-stage fermenting device, which comprises the step of culturing micro-organisms aerobically or anaerobically, in a device comprising a vertical stack of compartments separated by horizontal plates provided with one or more holes by introducing gas and culture medium from the bottom and maintaining a layer of gas beneath each plate which prevents backflow of medium from any compartment to one therebelow.

SUMMARY OF THE INVENTION

This application is a continuation of our prior application, Ser. No. 672,870, filed Oct. 4, 1967, now abandoned.

This invention relates to a method of fermentation utilizing a multi-stage fermenting device, and more particularly to the method of fermentation according to which micro-organisms are cultured aerobically or anaerobically in the fermenting device which functions as a multi-stage system by providing one or more perforated plates extending horizontally thereacross.

Industrially, microbiological fermentation is usually carried out by a batch process. Continuous process techniques have been sought, using either a single fermenting device or a plurality of such fermenting devices arranged in series, but nothing has yet been so fully developed as to be suitable for commercial purposes. Generally speaking, a continuous process may be carried out with a single fermenting device in the case of growth-associated fermentation in which the formation of a desired product takes place along with the growth of the micro-organism in the culture medium. It is also used with a plurality of fermenting devices in the case of nongrowth-associated fermentation, where the formation of a desired product does not occur with the growth of micro-organism, but occurs after the microbial growth has been completed. In this latter case continuous fermentation must be preformed with a plurality of fermenting devices, in each of which a certain culturing phase different from the others is carried out, so that the microbial growth and product formation take place separately during the process. However, this requires additional installations such as an aeration system, an agitator, a metering pump, and so forth with a capacity proportional to the number of fermenting devices used; and, therefore, when placed in commercial use, it is very expensive to provide the equipment necessary to carry out the process.

The present invention relates to a method of continuous fermentation utilizing a fermenting device comprising a plurality of compartments and having unique characteristics. One of the most important of these characteristics is the maintenance layer of air beneath each perforated plate. This prevents free mixing of the liquid in any given compartment with that in a compartment therebelow. Furthermore said device can completely overcome the aforementioned disadvantages of the prior art continuous processes because of the following outstanding features:

(1) It is of simple construction.
(2) It does not necessarily require an agitator, for the liquid is well stirred by aeration.
(3) It does not require a pump for transferring the broth from one vessel to another.
(4) It is easy to maintain the steady state.
(5) Its operation is simple and easily automated.
(6) Cooling and heating are carried out with high efficiency, due to the large heat-transfer area per unit internal volume.
(7) When a solid substrate material is used in fermentation (hereinafter referred to as "solid fermentation") the dispersed solid particles will be held in the column by the operation of the multiple device, usually producing a good yield in proportion to the solid raw material supplied because there is little loss of material caused by overflow of the liquid.
(8) In solid fermentation, there is no need either to pulverize the material, or to use a solvent which may be harmful to the micro-organisms.

The multi-stage fermenting device used for the process according to this invention is composed basically of a column forming the body of the fermenting device, and one or more plates, each provided with one or more holes said plate or plates being positioned horizontally across the fermenting device, thus dividing it into sections. Structurally speaking, the body sections of the fermenting device, each with both ends open and flanged, are stacked one above the other, with a plate provided with a hole or holes inserted between each two sections so as to build up a series of compartments, which are enclosed by covering the top and bottom. (Each compartment, when hereinafter referred to, is numbered from the bottom upward, namely, the first compartment, second compartment, etc.) When actually used, it must have inlet and outlet openings on both ends for both air and medium, plus heating and cooling means (e.g., a jacket), a thermometer, sampling nozzles (or cocks) and such other auxiliary parts as may be useful.

A more detailed account of the fermenting device will now be given with reference to the accompanying drawings, in which.

Figure 1:
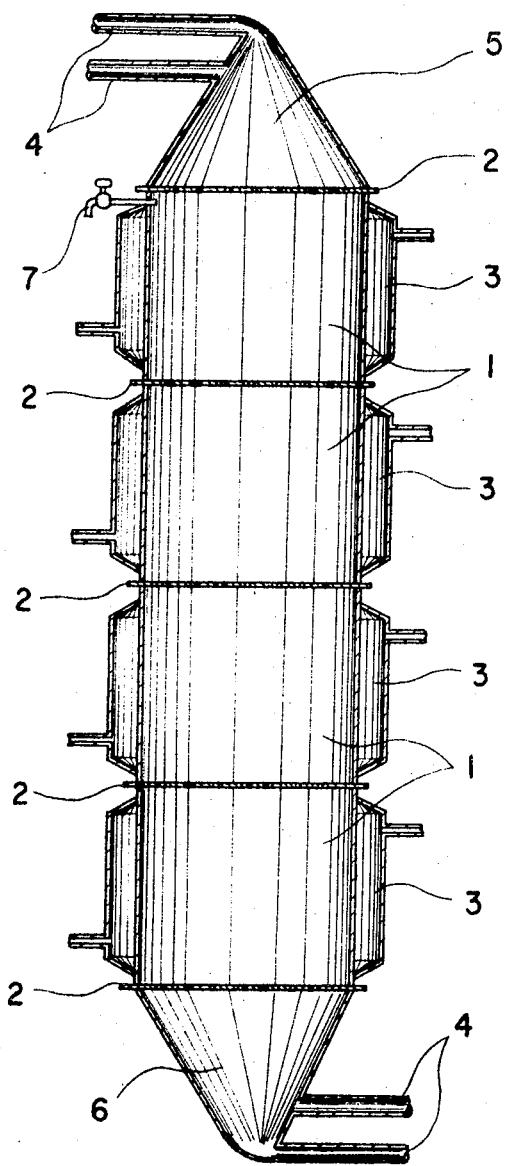
FIG. 1 is an axial vertical section taken through the fermenting device used for the process according to the present invention.
Figure 2:
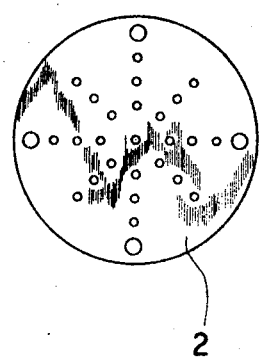
FIG. 2 is a plan view showing a perforated plate.

Turning now to FIG. 1, this shows in vertical section a cylindrical, multi-stage fermenting device consisting of four compartments 1, set one above the other, with the plates 2 as dividers. (FIG. 2 shows the plane surface of a plate.) Each compartment may be provided with temperature regulating means such as a jacket 3 and an electric heater (not shown), and both the top and bottom headers 5, 6 are connected to a pair of pipes 4 permitting the inflow and outflow of air and medium, respectively. These pipes may be directly connected to the compartments, and in such case, headers 5 and 6 are not needed.

Figure 3:
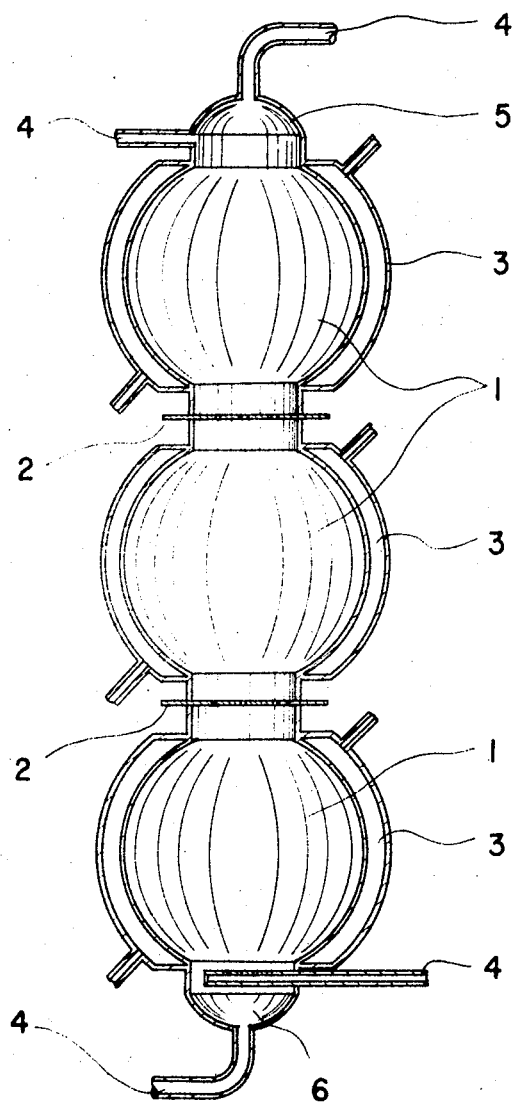
FIG. 3 is an axial vertical section taken through another embodiment of the fermenting device used for the process according to the present invention.
Figure 4:
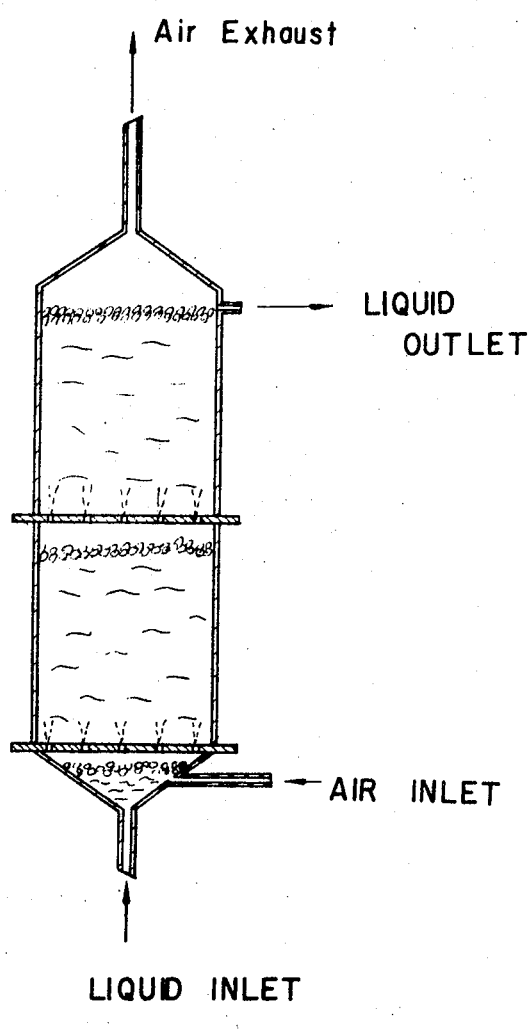
FIG. 4 shows the condition inside each compartment of the fermenting device when the culture medium is under fermentation.

The fermenting device usually comprises a number of compartments of uniform shape and size stacked one above the other, but it may comprise compartments which differ in form and size. The object is to have it divided by means of a plate or plates, each with at least one hole in it. Therefore, the size, height and width of the fermenting device are optional, and the shape of the compartment can be part-spherical, as shown in FIG. 3, or oval or cubical.

The body parts may be made of either metal, glass or plastic; but transparent material is useful, since it shows the inside of the fermenting device while in operation. The material from which the plates are made is also optional, but the medium components and the product produced as result of fermentation, which may act upon and corrode the plate material, should be taken into consideration. Sometimes, wire-netting or foraminous plates are used; the size of each hole and the number of holes (opening area) are determined by such factors as the linear velocity of air passing through the perforated plate, the size of the fermenting device and the type of microbial reaction desired. The number of compartments is determined by the best conditions from the point of view of such factors as desired fermentation type, the height and volume of the fermenting device, aeration system, the pressure drop, and so forth. Each plate inserted may be bolted to the flanged edges of the body parts with packing in between. Sampling, feeding and/or extracting nozzles (or cocks) 7 mounted on individual compartments are also useful for controlling fermentation, as they allow liquid to be withdrawn or introduced. An air filter is installed as in conventional fermentation equipment. Finally, this multi-stage fermenting device can be used either singly or as one of a group.

The basic characteristics of this fermenting device as above-disclosed will be further apparent from the following experiments:

EXPERIMENT 1

The effect of the characteristics of the plate, that is, the diameter of holes and the ratio of the perforated area of each plate to the total area of that plate, on the flow characteristics of the fermenting device used for the process according to this invention was investigated. The device, as shown in FIG. 1, was divided with perforated plates into four compartments each having the diameter of 7 cm. and the height of 12 cm. Water was pumped into said device from the bottom and overflowed from the top compartment, at the rate of 6 liters per hour. On the other hand, the air was supplied from the bottom through the nozzle attached thereto, at the rate of 10 liters per hour.

Figure 6:
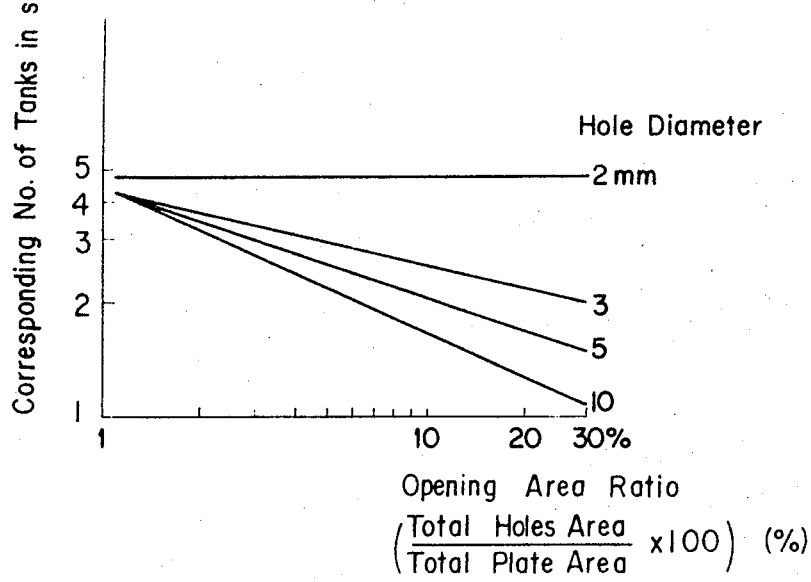
FIG. 6 shows the overall flow characteristics of the fermenting device in relation to various combinations of the hole diameter of a plate with the ratio of the opening area of each plate to the total area of that plate, using plain water according to Experiment 1.
Figure 7:
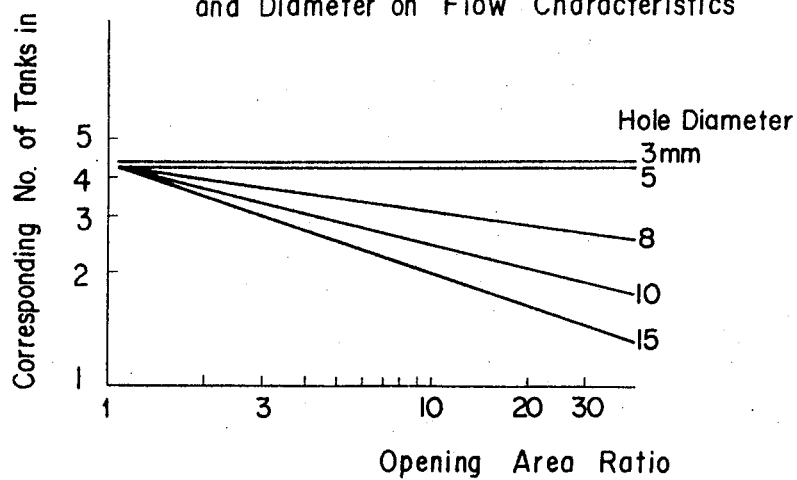
FIG. 7 shows lso the overall flow characteristics of a fermenting device in relation to various combinations of the hole diameter of a plate with the ratio of the opening area of each plate to the total area of that plate, using the actual fermented broth according to Experiment 2.

With the air and liquid running at a steady state, a tracer solution was introduced from the water inlet by means of injecting $\delta$ functionally. The change in the tracer concentration was determined at predetermined intervals at the outlet of said device, and consequently a response curve, i.e., response to the disturbance, was obtained. The overall flow characteristics were expressed by the corresponding numbers of tanks arranged in series, as in FIG. 6. If each compartment of the device stays independent from others at the steady state with aeration, the corresponding number of tanks in series should be four. But, if there is any backmixing among the compartments, the number should be less than four. This means that a multi-stage fermenting device as in this invention performs in the same manner as the corresponding number of tanks of equal volume arranged in series.

Using plates having holes 2 mm. in diameter with the ratio of the total area of holes in each plate being within the range of 1 to 30% of the total plate area, the performance of the fermenting device was not affected. However, with more than 3 mm. in diameter, the ratio of the opening area to the total area should be smaller in order to maintain the heterogenity in the fermenting device. From this experiment, it was concluded that there are very complicated relationships between the hole diameter and the ratio of the perforated area of a plate to the total area of that plate required to achieve an optimum condition. The above experiment was based on the strict water-air system, and therefore the situation is largely affected by the system employed.

EXPERIMENT 2

The effect of the plate characteristics as described in Experiment 1 on the flow characteristics of a fermenting device according to this invention was investigated, this time using an actual fermented broth.

Figure 5:
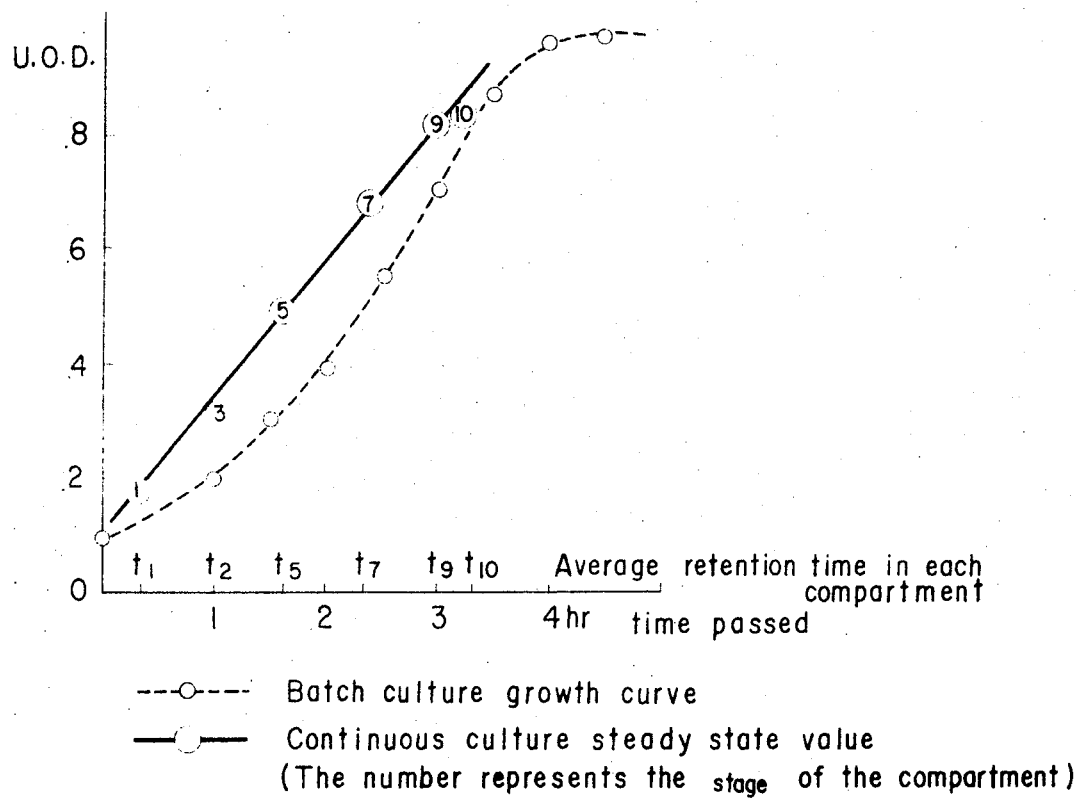
FIG. 5 is a graph illustrating the relationship between the cell concentration and the average retention time in each compartment in comparison with a batch culture growth curve according to Experiment 4, showing that said cell concentration attains a steady state in a continuous process using the multi-stage fermenting device according to the present invention.

Xanthomonas campestoris B-324 was cultured in a medium consisting of 3% glucose, 0.2% peptone, 0.2% fumaric acid, 0.2% $KH_2PO_4$, 0.2% $Na_2CO_3$, 0.05% $MgSO_4 \cdot 7H_2O$, at a pH adjusted to 6.0 with NaOH, at 30° C. for two days. The resulting culture broth, which showed viscous characteristics, was checked to determine the flow characteristics of said fermenting device, following the same steps as described in Experiment 1. The results were summarized as in FIG. 7.

Using plates having holes 3 and 5 mm. in diameter with the ratio of the total opening area in each plate within the range of 1 to 30% of the plate area, heterogenity was thoroughly maintained in the fermenting device. However, with more than 8 mm. in hole diameter, the ratio of the opening area should be smaller in order to maintain heterogenity.

From the above Experiments 1 and 2, it is apparent that such correlation was a complicated function of the liquid properties such as density, viscosity and surface tension, the aeration rate, and the liquid flow rate.

In these experiments a culture medium was introduced into a fermenting device equally divided into compartments by plates placed thereacross, each plate being provided with holes.

A seed culture which had been cultured as above-described was inoculated.

An air zone was formed beneath each perforated plate and the medium in each compartment did not flow backward into the lower adjacent compartment, so that each compartment of the device functioned nearly individually as a single fermenting device.

EXPERIMENT 3

Following the above procedures, fermentation was carried out in fermenting device, which was divided into ten compartments with the plates equally spaced, each plate being provided with holes 2 mm. in diameter and having a total area equal to 11% of the total cross-sectional area of that plate.

After three hours of culture initiation, a medium comprising 0.1% glucose, 0.05% yeast extract, 0.5% $NH_4Cl$, 0.1% $NH_4NO_3$, 0.2% $Na_2SO_4$, 0.01% $MgSO_4 \cdot 7H_2O$, 0.3% $K_2HPO_4$ and 0.1% $KH_2PO_4$ was supplied at a constant rate from the bottom of the fermenting device. The dilution rate set against the total volume of the medium was ⅓ $hr.^{-1}$. Particularly, the amount of medium supplied was so adjusted that the dilution rate in the bottom compartment did not exceed the maximum specific growth rate of the microorganism. The liquid which was carried up through the fermenting device overflowed from the top.

Differences in the cell concentration from one compartment to the next became more obvious as time went on, and after from 17 to 20 hours the gradient in cell concentration entered into a steady state. The cell concentration (U.O.D.) at this state and the nucleic acid content per U.O.D., in individual compartments, are indicated in Table 1. FIG. 5 also shows the cell concentrations in some compartments, in relation to the average retention time, along with the batch culture growth curve, in comparison.

TABLE 1

| Compartment (from bottom) | Cell concentration (U.O.D.) | Relative value of nucleic acid (RNA/U.O.D.) |
|---|---|---|
| 3 | .310 | 100 |
| 5 | .492 | 67 |
| 7 | .698 | 56 |
| 9 | .792 | 53 |
| 10 | .810 | 52 |

The foregoing applications of the invention are further illustrated by the following examples:

EXAMPLE 1

A cylindrical fermenting device, 6 cm. in inside diameter and 120 cm. in height was divided into equal parts by four transverse plates, each plate having a plurality of holes 2 mm. in diameter with the total area of said holes accounting for 20% of the total surface area. (See FIG. 1.)

Crude industrial naphthalene, 10% by weight of the total liquid, was introducet into the second compartment from the bottom, and a bacteria free culture medium, which contained 0.25% ammonium chloride, 2% manganese chloride, 0.005% ferrous sulfate, and 0.05% calcium chloride, was poured in, after which the compartment was inoculated with *Pseudomonas aeruginosa* B-344.

As fermentation was carried out at 30° C. under aeration at a linear velocity of 8 cm./sec. some of the solid phase naphthalene in said compartment passed through the holes in the plates into adjacent compartments, and after 36 hours of fermentation, 10.6 g./l. of salicylic acid was produced. Further fermentation did not reduce or decompose this salicylic acid.

When fermentation was completed, the fermented broth was taken out of the bottom of the fermenting device, and 85% of the initial solid naphthalene was collected in the fermenting device. Using this recovered naphthalene and the cells which remained in the fermenting device, another fermentation cycle was carried out by merely supplying the above-described mineral solution. This was repeated six times.

EXAMPLE 2

A culture medium consisting of 10% glucose, 1% urea, 0.1% $KH_2PO_4$, 0.04% $MgSO_4 \cdot 7H_2O$, 0.6% corn steep liquor, 0.1% yeast extract, 2 p.p.m. $Fe^{++}$, 2 p.p.m. $Mn^{++}$ and 2 mg./l. Biotin, was introduced into the same fermenting device as in Example 5, in same manner. After sterilization, the medium was cooled to 30° C. and inoculated with the seed culture, in an amount equal to 3% by volume of the medium, which seed culture was obtained by culturing *Corynebacterium gelatinosum* 7183 in a medium having the same composition as described above, with the sole exception that the glucose content was 8%. This was then cultured at 30° C. under aeration at 200–400 cm.³/min. After 58 hours, the DL-alanine content in the medium reached 40 g./l. The number of plates used is optional and does not in itself affect the outcome of the operation in the case of this batch process.

A continuous process using the same ingredients and five equidistant plates across the fermenting device was then tried. $\frac{1}{12}$ of the total medium volume each hour was supplied from the bottom of the fermenting device. Within 24 hours or so, the steady state was attained. The cell and alanine contents in the medium in the respective compartments differed from one another. Both contents were found to be highest in the uppermost compartment, to wit: 34 g./l. alanine and 9.2 U.O.D. of bacterial cells. Incidentally, the alanine content in the respective compartments were, from the bottom to the top: (1) 0.5 g./l., (2) 5 g./l., (3) 17 g./l., (4) 29 g./l., (5) 34 g./l.

EXAMPLE 3

Following the procedures described in Example 1, the medium was prepared and inoculated with the same bacterial inoculum. Naphthalene was used as in Example 1.

After 24 hours of fermentation, the salicylic acid content in the medium reached 6.2 g./l. From this point on, a sterilized inorganic salt solution was introduced from the bottom by means of a metering pump. The proportion of said solution to the total liquid in the fermenting device, or the dilution rate, was $\frac{1}{15}$ hr.$^{-1}$ per unit time. After 40 hours from the beginning of the process, each compartment contained bacterial cells and salicylic acid, and the steady state was attained. Salicyclic acid produced was, from the bottom compartment to the top: (1) 0.8 g./l., (2) 0.8 g./l., (3) 6.3 g./l., and (4) 7.5 g./l. The content in the fourth compartment was identical to the content in the discharged fermented broth. The fermentation was carried out continuously for about 10 days until the solid naphthalene in the fermenting device was completely consumed.

EXAMPLE 4

A 5-liter fermenting device of the columnar type was divided into six compartments with each plate having 20% of its total area occupied by holes which are each 2 mm. in diameter, so as to have the first (bottom) compartment 1.5 liters in volume and the rest 0.7 liter each. Using light oil, the fermentation of yeast, (*Canadida lypolitica*) and deparaffination were carried out.

100 parts of medium (pH 4.5) consisting of 3.0 g. of ammonium sulfate, 1.0 of potassium phosphate, 0.5 g. of magnesium sulfate, 0.1 g. of yeast extract and a small amount of trace elements per liter, was mixed with 15 parts of light oil and 0.02 part of a surface active agent (Tween 40) so as to form a stable emulsion.

Before this step, *Candida lypolitica* had been cultured for 35 hours in a medium having the same composition as above. 5% by volume of this precultured *Candida lypolitica*, was added to the above emulsified medium and cultured at 28° C. while being aerated at the rate of 15 lit./min.

After 24 hours of fermentation, an emulsified medium mixed with 15 parts of light oil per 100 parts of water was introduced from the bottom at 300 ml./hr., thus producing continuous fermentation. The fermented broth composed of yeast cell, unutilized light oil and water, which had been retained for a certain time, was discharged successively from the top of the fermenting device.

After reaching the steady state, sample broth was taken from each compartment which contained yeast cells and light oil as follows: 1.6 g./liter (dry weight) of cell mass and 14.0 parts (by volume) of oil layer (to 100 parts of initial water) in the first compartment, 25 g./l. and 12.8 parts in the third, and 3.1 g./l. and 11.5 parts in the fifth. The broth which overflowed was separated into cell bodies deparaffinated light oil and water, by known methods.

EXAMPLE 5

In a fermenting device having an inside diameter of 6.5 cm. and divided into ten compartments with each of the plates being provided with a hundred 2 mm. holes, the production of bacterial spores was carried out in a continuous process.

As the seed culture, *Bacillus stearothermophilus* ATCC 8005, stored on a bouillon agar slide, was inoculated into the glucose-bouillon medium and cultured under aerobic conditions at 55° C. The main spore production was initiated with 5% by volume of this culture. The total volume was 4.0 liters.

The medium contained 6 g. of glucose, 12 g. of yeast extract, 1 g. of $KH_2PO_4$, 0.1 g. of $MnSO_4 \cdot H_2O$, 0.01 g. of $FeSO_4 \cdot 7H_2O$, 0.1 g. of $CaCl_2$ and 1 liter of distilled water. After 4 to 5 hours, additional medium was continuously supplied to the bottom of the fermenting device at 360 ml./hr. The fermented broth which contained spores overflowed from the top. The cell concentration increased toward the upper compartments. Dipicolinic acid was not detected in the lower compartments, but only in the compartments above the sixth.

The dipicolinic acid content was maintained at 60 γ/ml. This enabled more than 80% of the total cells to form spores under the culturing conditions. The spore-containing broth was centrifuged, or the spores were collected from the spore suspension by the froth floatation method.

EXAMPLE 6

Using a culture solution of *Escherichia coli*, IAM–1253, which had been cultured in a medium containing 2% glu- terial cell were concentrated and/or fractionated. To the terial cell were concentrated and/or fractionated. To the above culture solution, 0.2 g./l. of aluminum sulfate and 40 mg./l. of lauric acid (ethanol solution) were added. The mixture was adjusted to pH 7.2 and poured into a cylindrical multi-stage fermenting device, 120 cm. in height and 6 cm. in diameter, divided into 11 compartments by 10 plates, each having 11% of its total area occupied by holes 5 mm. in diameter. Air was introduced into the above fermenting device after it had been filled with the mixture at a superficial velocity of 7 cm./sec. After 25 minutes of aeration, a sample solution was taken from each compartment and the number of cells therein was determined. The results showed that the number of cells in the top compartment surpassed that in the bottom one by about 10 times. The number of cells in the intervening compartments differed stepwise from one compartment to the next, increasing from the bottom to the top. Although the cell bodies in the various compartments were not visible through a microscope, non-bacterial solid substances were seen in the lower compartments, the number of which increased toward the bottom. The physiological activities of the cell bodies taken from the respective compartments, were determined in terms of the oxidation potentialities of a unit cell with glucose as the substrate. The table below gives the results in figures. The total U.O.D./ml. was obtained by multiplying the optical density at 610 m$\mu$ of the diluted sample by the number of dilutions; it was 5.0 in all compartments before aeration. But, after aeration, it varied from 1.0 in the bottom to 10.4 in the ninth compartment.

The table below also shows the number of cells in each compartment against the total cell number: 73% of the total number of cells were found in the compartments 7 to 10, and the remaining 27% in the first to sixth compartments. $Q_{O_2}$ in the Table, the rate of oxygen absorption per unit cell, is given comparatively with the value in the first compartment, as the basic value, 1.00. It is obvious that the activity is the lowest in the first and increases towards the upper compartments.

TABLE 5

| Compartment (from bottom) | U.O.D. (610 m$\mu$) | Distribution of cells, percent | $Q_{O_2}$ |
|---|---|---|---|
| No. 1 | 1 | 1.97 | 1.00 |
| No. 3 | 2.1 | 4.13 | 1.10 |
| No. 5 | 3.8 | 7.48 | 1.30 |
| No. 7 | 8.1 | 15.95 | 1.38 |
| No. 9 | 10.4 | 20.47 | 1.50 |

EXAMPLE 7

A culture medium (pH 7.0) containing 0.5% glucose, 1.3% yeast extract, 0.1% $KH_2PO_4$, 0.01% $MnSO_4 \cdot H_2O$, 0.001% $FeSO_4 \cdot 7H_2O$ and 0.005% $MgSO_4 \cdot 7H_2O$ was inoculated with *Bacillus subtillis* IAM/1214 and cultured by areation-agitation for 24 hours at 30° C. At the end, $1.9 \times 10^7/cm.^3$ of spores were formed from a total of $2.1 \times 10^9/cm.^3$ cells. Two liters of the above solution in which the spores and the vegetative cells of the above strain were mixed were introduced into a multi-state fermenting device 3.2 liters in volume, divided into nine compartments by eight plates (having 16% of their area occupied by holes 4 mm. in diameter). The air was introduced through an aeration nozzle at the bottom, at the rate of four liters per minute. At a pH of 7.3 and a temperature of 28° C., foaming started in the compartments, and an advanced stage of foaming was observed immediately below each plate. The amount of air was increased every five minutes by 0.5 liter per minute, until it finally reached nineteen liters per minute. This increased the volume of the foaming layers at the advanced stage so that a certain amount of the culture solution was held in each compartment. After 120 minutes of aeration under the above conditions, the number of spores was determined for the top two and bottom two compartments: $1.1 \times 10^{10}/cm.^3$ and $1.0 \times 10^{10}/cm.^3$ for the top two, and $2 \times 10^7/cm.^3$ and $1.2 \times 10^7/cm.^3$ for the bottom two, respectively. In other words, the above results indicate that about 90% or more of the total spores were collected in the top two compartments. It also indicates that, since the number of cells in the respective compartments did not differ greatly, the number of spores per number of cells increased considerably within these top compartments. The liquid in these compartments was taken and used as a spore suspension.

We claim:
1. A process for fermenting microorganisms utilizing a stack of compartments separated each from the other by transverse plates provided with holes large enough to pass said micro-organisms, said process comprising the steps of:
   providing a liquid culture medium in said device, which medium is inoculated with a strain of microorganism,
   cultivating said microorganism by continuously introducing a gas required for said cultivation from the bottom of the device at a rate sufficient to permit said medium and microorganisms to pass from one compartment to another while maintaining a layer of gas beneath each perforated plate and while maintaining the temperature of the culture medium at a value suited to such cultivation,
   simultaneously introducing additional culture medium from the bottom of the device concurrently with said gas,
   inhibiting the downflow of medium from any one compartment to a compartment therebelow by maintaining beneath each plate a small volume of gas which separates the medium in successive compartments, so that the cell concentration in the stack increases from compartment to compartment in the direction of medium flow as the microorganism multiplies,
   and withdrawing said gas and liquid culture medium from the uppermost compartment.
2. A fermentation process as claimed in claim 1 in which said plates are perforated by holes no more than 2 mm. in diameter, and the ratio of the total area of the holes in each plate to the area of said plate is less than 30%.
3. A fermentation process as claimed in claim 1 in which each plate is perforated by holes no more than 5 mm. in diameter having a total area less than 30% of the total area of that plate.
4. A fermentation process as claimed in claim 1 in which each plate is perforated by holes from 2 to 10 mm. in diameter having a total area between 1 and 10% of the total area of that plate.
5. A fermentation process as claimed in claim 1 in which said additional culture medium is introduced at a rate no more than sufficient to offset the increase in cell concentration resulting from the growth of the microorganisms.
6. A fermentation process as claimed in claim 1 which is aerobic and in which said gas contains oxygen.

7. The method claimed in claim 1 in which said medium comprises at least one petroleum produced which is fractionated by said microorganisms.

8. A continuous fermentation process for the cultivation of living microbial cells which consists of the steps of continuously supplying a stream of gas and a supply of fermentable liquid to the first of a plurality of interconnected fermentation zones containing living microbial cells capable of fermenting said fermentable liquid, said plurality of fermentation zones being interconnected through perforated plates which allow a restricted flow of said gas therethrough, flowing said stream of gas upwards through each of said plurality of fermentation zones in the same direction as the flow of said fermentable liquid and thereafter to the bottom of the next adjacent fermentation zone, whereby products of fermentation are formed in said plurality of fermentation zones, withdrawing said stream of gas and said fermentable liquid containing said products of fermentation from the last of said plurality of fermentation zones, said restricted flow of gas between said interconnected fermentation zones forming a gas layer in the upper part of each of said fermentation zones thus causing the liquid phase in said interconnected fermentation zones to be discontinuous from one zone to the next, said restricted flow of said gas being sufficient to permit said fermentable liquid, living microbial cells and products of fermentation to pass from the top of each of said fermentation zones to the bottom of the next adjacent fermentation zone.

9. A multi-stage fermenting device comprising a vertical stack of compartments separated by one or more plates, means for introducing culture media and gas at the bottom of said stack, means for withdrawing culture media and gas at the top of said stack, said means for controlling the temperature in said compartments, said plates being provided with perforations having a total area of at least 1% but not more than 30% of the total area of said plate and said perforations being large enough to pass said culture, but small enough to permit the accumulation of a gas layer beneath each plate and thus no more than 5 mm. in diameter.

10. A multi-stage fermenting device comprising a vertical stack of compartments separated by one or more plates, means for introducing culture media and gas at the bottom of said stack, means for withdrawing culture media and gas at the top of said stack, and means for controlling the temperature in said compartments, said plates being provided with perforations having a total area of at least 1% but not more than 10% of the total area of said plate and said perforations being large enough to pass said culture, but small enough to permit the accumulation of a gas layer beneath each plate and thus no more than 10 mm. in diameter.

References Cited
UNITED STATES PATENTS 3,173,793   3/1965   Shore et al. _____ 195—143

ALVIN E. TANENHOLTZ, Primary Examiner

U.S. Cl. X.R.

195—141, 142, 143, 28 R, 47, 82, 96